Sept. 6, 1932. B. L. NEWKIRK ET AL 1,876,520

SHAFT PACKING

Filed April 22, 1931  2 Sheets-Sheet 1

Inventors:
Burt L. Newkirk,
Lloyd P. Grobel,
by Charles E. Tulla
Their Attorney

Sept. 6, 1932.  B. L. NEWKIRK ET AL  1,876,520
SHAFT PACKING
Filed April 22, 1931  2 Sheets-Sheet 2

Inventors:
Burt L. Newkirk,
Lloyd P. Grobel,
by Charles V. Tullar
Their Attorney.

Patented Sept. 6, 1932

1,876,520

UNITED STATES PATENT OFFICE

BURT L. NEWKIRK AND LLOYD P. GROBEL, OF SCHENECTADY, NEW YORK, ASSIGNORS TO GENERAL ELECTRIC COMPANY, A CORPORATION OF NEW YORK

SHAFT PACKING

Application filed April 22, 1931. Serial No. 532,008.

The present invention relates to shaft packings for preventing leakage between a shaft or like rotating member and the surrounding casing wall through which the shaft projects and has for its object an improved packing which is well adapted for use with a mercury turbine system although it is not necessarily limited thereto.

A packing for a mercury turbine presents problems not met with in steam turbines in that it is very important that no mercury vapors escape to the atmosphere and that no mercury be lost; also that air be prevented from coming into contact with the mercury and forming oxides therewith. The packing according to our invention meets the requirements of a mercury turbine in a wholly satisfactory manner.

For a consideration of what we believe to be novel and our invention, attention is directed to the accompanying description and the claims appended thereto.

Figure 1:
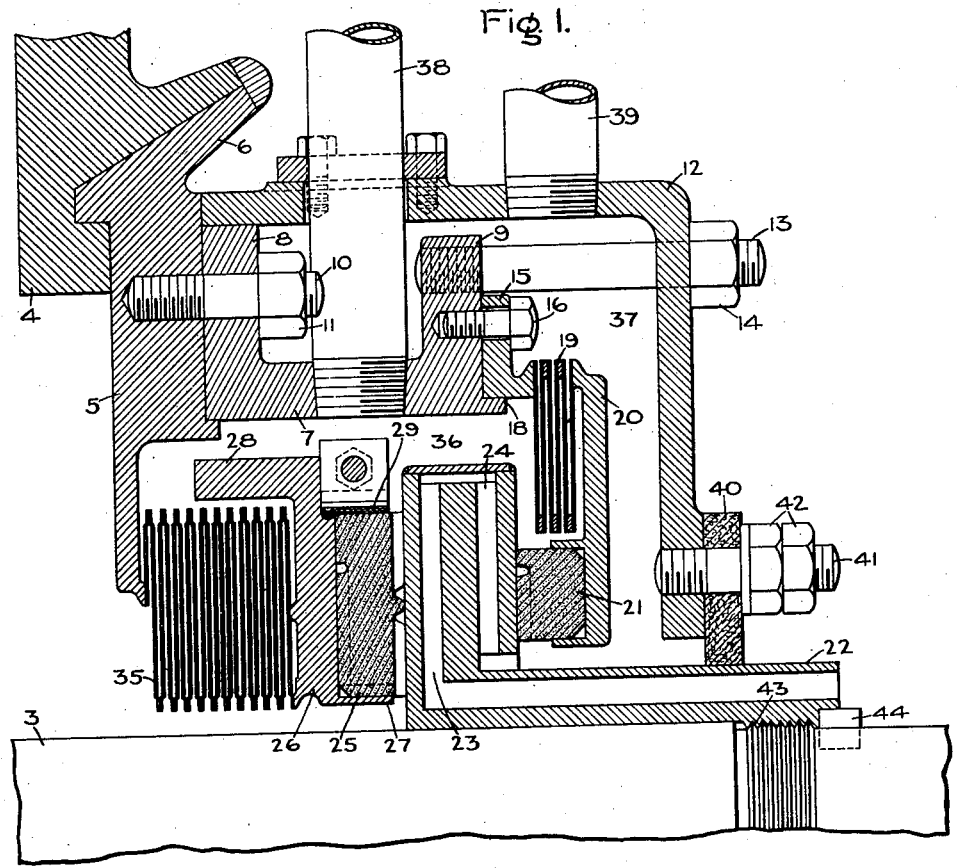
Figure 2:
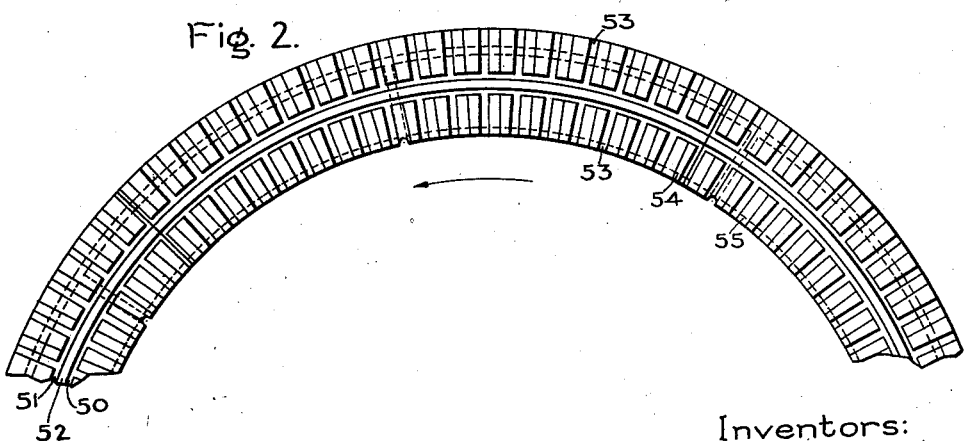
Figure 3:
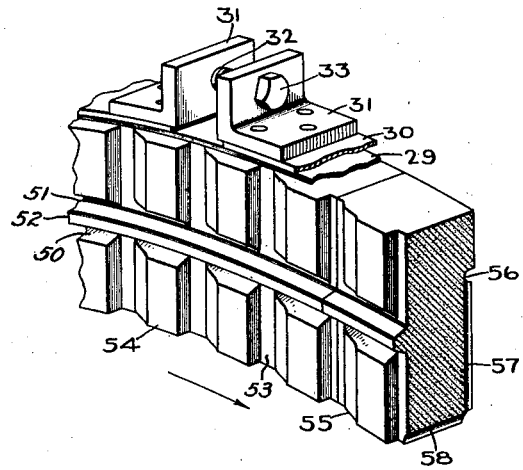
Figure 4:
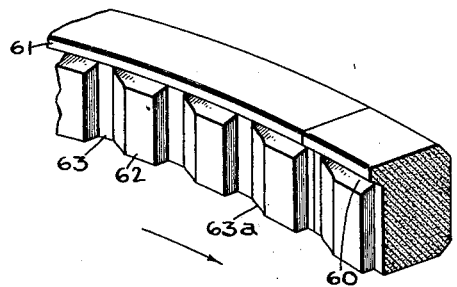

In the drawings, Fig. 1 is a sectional view of a packing embodying our invention, partly diagrammatic; Fig. 2 is a front view of a sealing ring; Figs. 3 and 4 are perspective views of sealing rings embodying our invention.

Referring to Fig. 1, 3 designates a shaft projecting through a turbine casing and carrying the wheels of said turbine, the outer end (to the right in the drawings) being supported by any suitable bearing, not shown in the drawings. Between the outer wall 4 of the turbine casing and the bearing is arranged the shaft packing. Wall 5 of the packing is provided with a flange 6 which is secured, preferably by welding, to the outer wall 4 of the turbine. 7 designates a ring member having flanges 8 and 9, the first of which is secured to wall 5 by means of bolts 10 and nuts 11. A casing 12 is tightly seated on the outer circumference of flange 8 and pressed against wall 5 by means of bolts 13 and nuts 14. Also secured to flange 9 is an annular ring 15 by means of headed bolts 16; the inner surface of ring 15 bearing against an annular shoulder 18 on flange 9. Ring 15 is provided with an annular projection to which one end of an accordion 19 is secured, the other end of which is fastened, preferably by welding, to a ring member 20. The inner part of the ring 20 has two annular projections which define a seat for a sealing ring 21. The left side of this sealing ring bears against a rotating member 22, hereafter termed a "runner", which is provided with cooling passages 23 and 24 through which a cooling medium is passed. The other side of said runner bears against a sealing ring 25, the left side and the inner face of which are supported by a ring member 26 which has flanges 27 and 28. Sealing ring 25 comprises a number of segments encircled by a strip 29 (Fig. 3) and pressed together by means of a flexible ring 30 having flanges 31 provided with holes 32 into which a bolt 33 is inserted for securing said flexible ring to the circumference of said sealing ring.

An accordion 35 is arranged between ring member 26 and wall 5, and is preferably welded to suitable annular seating portions of said parts. From a consideration of the drawings it will be seen that the different parts above described from two chambers 36 and 37. The space to the left of and below accordion 35 and ring member 26 communicates with the inner space of the turbine and is therefore under vacuum. The space above accordion 35 and between this accordion and accordion 19 and sealing ring 21, defining chamber 36, is connected to a gas line through a conduit 38 and so kept filled with illuminating gas or other gas low in oxygen at a pressure slightly above atmosphere. The space between ring member 20 and the outer casing 12 forming chamber 37 is connected by means of a conduit 39 to a flue, not shown in the drawings, and maintained at a pressure slightly below atmosphere. Air, which forms a cooling medium, is passed through the passages 23 and 24 of the runner 22 through chamber 37 and exhausted through conduit 39. 40 designates a felt ring secured by means of bolts 41 and nuts 42 to the casing 12 and forming a seal between said casing and runner 22. The latter has at its inner surface a threaded portion 43 engaging a corresponding threaded portion of turbine shaft 3 and fixed in its position by a suitable key 44.

It will be readily understood that as a consequence of the arrangement of sealing rings, accordions and pressures in chambers 36 and 37, no air leaks into the vacuum space of the turbine. Leakage which thus occurs across sealing ring 25 into the vacuum space of the turbine is of non-oxidizing gas. Some of this gas will also escape past packing ring 21 into chamber 37 where it is mixed with a large quantity of cooling air passed through the passages 23, 24 of the runner 22 and exhausted through conduit 39.

Having so far described the general arrangement and operation of our new shaft packing, we will now more specifically describe the construction of the packing rings 21 and 25 used in connection with this arrangement and forming a part of our invention.

According to our invention the packing rings are made of a graphitic carbon which results in comparatively little wear of the adjacent runner and the rings themselves.

Figs. 2 and 3 illustrate the details of packing rings 25 of Fig. 1. Two circumferential grooves 50 and 51 are provided in the sealing surface of the ring, defining therebetween what may be termed a "sealing strip" 52. The surfaces outside of said grooves are provided with radial grooves 53 which divide said surfaces into short sectors 54 which form bearing surfaces. The latter have beveled entrance edges 55 which change gradually from axial planes to planes transverse to the shaft and parallel to the surface of the ring. With the face of the ring so divided and the runner rotating in the direction indicated by the arrow, gas is drawn between the runner and the ring, whereby it forms a thin sealing film which diminishes the friction losses between said ring and runner to a considerable extent. Without these grooves and beveled edges of the bearing surfaces there would be considerably more friction wear of the rings. The film of gas or other sealing medium is so thin that it does not separate the ring from the runner far enough to cause serious leakage across the sealing strip. An annular groove 56 and radial grooves 57 are provided at the inner surface of the ring, and axial grooves 58 are provided at the inner circumference of the ring. These groves 56, 57, 58 cause vacuum to exist on the inner face of the sealing ring beyond the location of the sealing strip of the outer ring surface, so that the ring is strongly sucked onto its seat.

Fig. 4 illustrates a somewhat simplified construction of such a ring and corresponds to ring 21 of Fig. 1. The total pressure drop across the sealing surface of ring 21 is comparatively low as the pressures in the chambers adjacent to this ring are slightly below and above atmosphere respectively. This fact allows such simplification of sealing ring 21. This ring accordingly is provided with only one radial groove 60 dividing the sealing surface into an outer comparatively small sealing strip 61 and an inner surface 62 which is provided with radial grooves 63 having beveled entrance edges 63$^a$ in the direction of rotation of the runner, as indicated by the arrow. The beveled entrance edges of the bearing surfaces into which said inner sealing surface is divided cause a film of air to be drawn between the sealing surface of said ring 21 and runner 22. This film has comparatively low friction with the adjacent members and therefore causes little wear thereon.

In accordance with the provisions of the patent statutes we have described the principle of our invention but we do not wish to be limited to the specific construction disclosed by the drawings appended hereto, as changes may be made therein without departing from the scope of our invention.

What we claim as new and desire to secure by Letters Patent of the United States is:

1. The combination with a shaft and a wall through which the shaft projects, of a packing for preventing leakage along said shaft, comprising a runner rigidly secured to said shaft to form a fluid-tight joint therewith, a sealing ring having two annular grooves defining a sealing strip therebetween and an inner and outer bearing surface, one of which is provided with radial grooves, and means for yieldingly pressing said ring against said runner.

2. The combination with a shaft and a wall through which the shaft projects, of a packing for preventing leakage along said shaft, comprising a runner rigidly secured to said shaft to form a fluid-tight joint therewith, a sealing ring having two annular grooves defining a sealing strip therebetween and an inner and outer bearing surface, one of which is provided with radial grooves having beveled entrance edges to cause said runner to draw a sealing medium between the bearing surfaces of said ring and runner, and means for pressing said ring against said runner.

3. The combination with a shaft and a wall through which said shaft projects, of a runner having cooling passages and being rigidly secured to said shaft and a packing for preventing leakage along said runner, said packing comprising an outer casing, two sealing rings, means for supporting and yieldingly pressing said sealing rings against the inner and outer surface of said runner respectively, means for fastening one of said supporting means to said outer casing whereby said runner and supporting means define two chambers within said casing, means for supplying an illuminating gas low in oxygen and slightly above atmospheric pressure to one of said chambers, and means for circulating air through the cooling passages of said runner and said other chamber at a pressure slightly below that of the atmosphere.

4. The combination with a shaft and a wall of an elastic fluid engine through which said shaft projects, of a runner having sealing surfaces, secured to said shaft, and a packing for preventing leakage along said runner, said packing comprising walls which form two chambers, one of which being adjacent to said engine wall, means for supplying a gas low in oxygen to said last named chamber, means for circulating air through said other chamber at a pressure below that of the gas in said other chamber, a sealing ring having annular and radial grooves, means for supporting and yieldingly pressing said ring against one sealing surface of said runner whereby a seal between said gas-filled chamber and the vacuum of said engine is formed, another sealing ring having annular and radial grooves and bearing against another sealing surface of said runner whereby a seal between said gas and air-filled chambers is formed.

5. A sealing ring having two annular grooves defining a sealing strip therebetween and an outer and inner sealing surface provided with radial grooves, extending from said annular grooves.

6. A sealing ring having two annular grooves defining a sealing strip therebetween and an outer and inner sealing surface provided with radial grooves which have beveled entrance edges.

7. A sealing ring having two annular grooves defining a sealing strip therebetween and an outer and inner sealing surface, one of which is provided with radial grooves which have beveled entrance edges.

8. A sealing ring having an inner sealing surface provided with two annular grooves defining a sealing strip therebetween and bearing surfaces adjacent to said grooves, one of which is provided with radial grooves and an outer surface which is provided with an annular groove defining a comparatively small sealing strip and a bearing surface which is provided with radial grooves.

9. A sealing ring having two annular grooves defining a sealing strip therebetween and radial grooves dividing the bearing surface into short lands with beveled entrance edges and axially arranged grooves at the inner circumference of said ring.

In witness whereof, we have hereunto set our hands.

BURT L. NEWKIRK.
LLOYD P. GROBEL.